(12) United States Patent
Collins

(10) Patent No.: US 6,315,333 B1
(45) Date of Patent: Nov. 13, 2001

(54) FLEXIBLE HOSE FORMED WITH INTEGRAL CONNECTOR HOUSINGS

(75) Inventor: Daniel T. Collins, Marine City, MI (US)

(73) Assignee: TI Group Automotive Systems Corp., Warren, MI (US)

( * ) Notice: Subject to any disclaimer, the term of this patent is extended or adjusted under 35 U.S.C. 154(b) by 0 days.

(21) Appl. No.: 09/164,941

(22) Filed: Oct. 10, 1998

Related U.S. Application Data

(63) Continuation-in-part of application No. 08/687,776, filed on Jul. 31, 1996, now abandoned.

(51) Int. Cl.[7] .................................................. F16L 37/00
(52) U.S. Cl. ........................................ 285/303; 285/319
(58) Field of Search .................................. 285/305, 319, 285/903, 260, 423

(56) References Cited

U.S. PATENT DOCUMENTS

| | | | |
|---|---|---|---|
| 3,606,402 | * | 9/1971 | Medney ............................ 285/305 |
| 3,759,553 | * | 9/1973 | Carter ............................... 285/260 |
| 4,423,892 | * | 1/1984 | Bartholomew ................... 285/319 |
| 4,813,716 | * | 3/1989 | Lalikos et al. ................... 285/305 |
| 4,819,970 | * | 4/1989 | Umerhara ......................... 285/903 |
| 4,893,845 | * | 1/1990 | Bartholomew ................... 285/319 |
| 4,989,905 | * | 2/1991 | Rajecki ............................. 285/903 |
| 5,209,523 | * | 5/1993 | Godeau ............................. 285/305 |
| 5,255,945 | * | 10/1993 | Toon ................................. 285/305 |
| 5,405,175 | * | 4/1995 | Bonnah, II et al. .............. 285/305 |

* cited by examiner

Primary Examiner—Eric K. Nicholson
(74) Attorney, Agent, or Firm—Wood Phillips VanSanten Clark & Mortimer

(57) ABSTRACT

A flexible hose for establishing a fluid connection between remote components of a fluid line system includes an integral housing formed directly in at least one end. Male member portions of the system components are received and retained in the integral housing. The hose housing includes a radial wall which engages an upset formed on the male member to prevent retraction of the male member from the hose. Sealing means in the form of O-rings may be disposed inside of the hose.

16 Claims, 1 Drawing Sheet

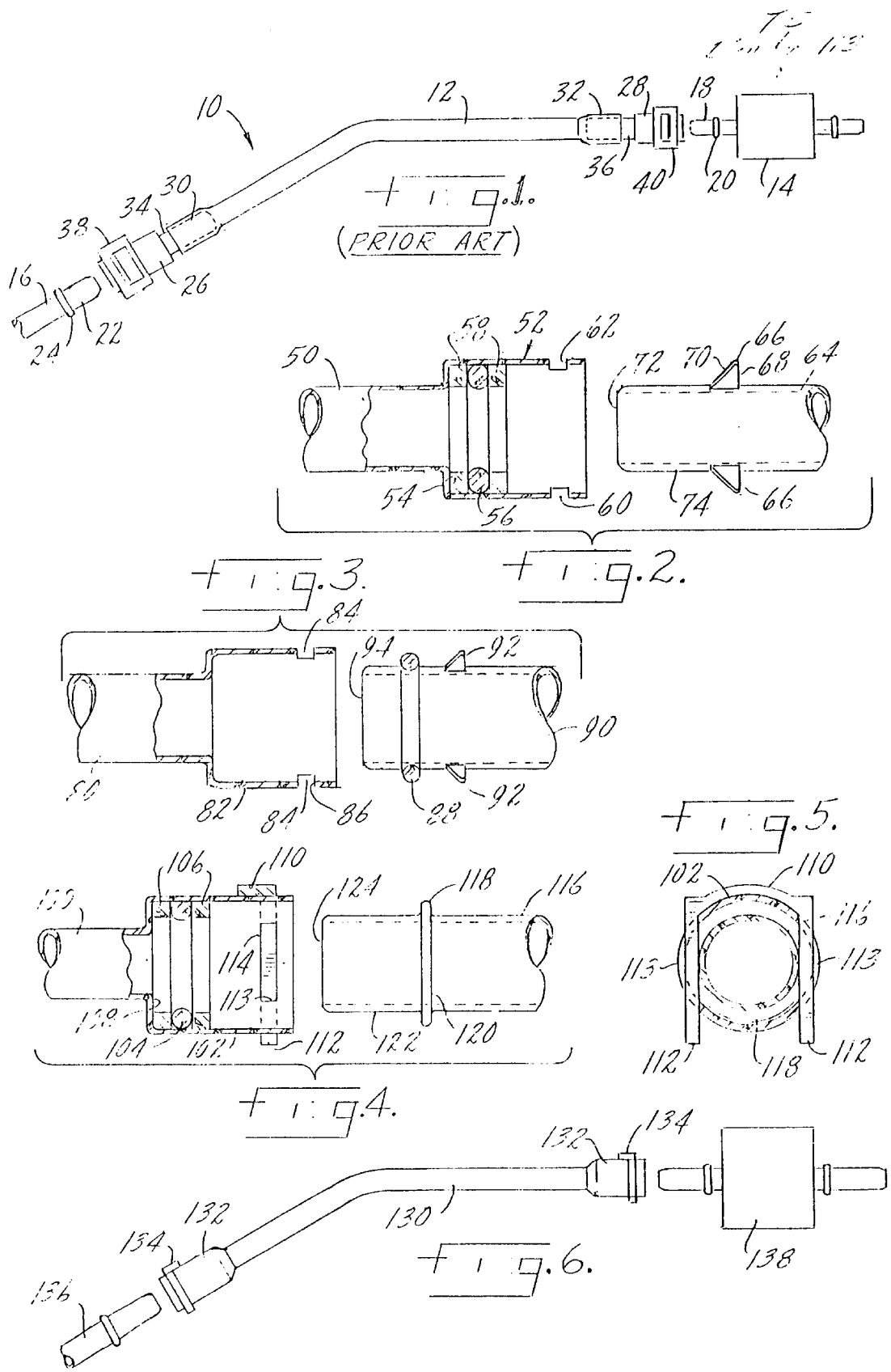

FLEXIBLE HOSE FORMED WITH INTEGRAL CONNECTOR HOUSINGS

This application is a continuation-in-part of U.S patent application Ser. No. 08/687,776, filed Jul. 31, 1996 now abandoned.

BACKGROUND OF THE INVENTION

This invention relates to fluid line systems in which flexible hose is utilized to establish fluid connections between remote components or conduits, and more particularly, to a flexible hose which can be coupled to a system component or conduit without use of an external attachment or coupling device.

In automotive and other fields, flexible hose is utilized to provide fluid connections between remote components or conduits. Typically, external attachment or coupling devices are used to attach or couple the hose to the system components and provide reliable seals therebetween. Coupling devices which have been used for this purpose include metal or plastic clamps and quick connector fittings.

FIG. 1 depicts a typical prior art fluid line system 10. A hose 12 is utilized to establish a fluid connection between fuel filter 14 and steel fuel line 16. Fuel filter 14 includes a male member portion 18 having an enlarged upset 20, and fuel line 16 includes a male member portion 22 having an enlarged upset 24.

Quick connectors 26 and 28 are employed to couple hose ends 30 and 32 to, respectively, fuel line 16 and fuel filter 14. Hose ends 30 and 32 are expanded over and retained on stem portions 34 and 36 of the connectors. Stem portions 34 and 36 may include barbs or bumps to enhance gripping of the hose. Housing portions 38 and 40 of the connectors receive the male member portions of fuel filter 16 and fuel line 14. Housing portions 38 and 40 include retainers or other locking means which engage upsets 20 and 24 to secure the male member portions inside of the connectors. In this manner, a fluid connection is established between fuel filter 14 and fuel line 16.

Use of external coupling devices, such as the quick connectors illustrated in FIG. 1, gives rise to various problems. External coupling devices add length to the fluid line and may conflict with geometrical constraints. Barbed-type fittings which engage the hose internal diameter may create undesirable internal line restriction. Additional potential leak paths are created through use of external coupling devices. Finally, production and installation of separate coupling devices leads to increased costs.

The present invention addresses these problems by providing a flexible hose having integral connector housings formed directly in its ends. These integral housings integrate the sealing and latching mechanisms necessary for coupling of the hose to a mating system component. The present invention is useful for low to medium pressure fluid applications and minimizes the problems noted in connection with use of external coupling devices.

SUMMARY OF THE INVENTION

A flexible hose for forming a fluid connection between components of a fluid line system includes an integral connector housing formed directly in at least one end. Male member portions of system components to be connected are insertable into the integral housing. The connector housing includes locking means for engaging upsets formed on the male member portions to prevent retraction of the male member from the hose. The locking means may be a radial wall defined in the integral housing. Alternatively, it may be a latch having locking beams extending through slots formed in the housing. Sealing means in the form of O-rings may be disposed inside of the hose or about the outer diameter of the male member.

BRIEF DESCRIPTION OF THE DRAWINGS

FIG. 1 is a side view of a typical prior art fluid line system which utilizes external coupling devices to couple a hose to system components;

FIG. 2 is a partial sectional view of a first embodiment of the present invention;

FIG. 3 is a partial sectional view of a second embodiment of the present invention;

FIG. 4 is a partial sectional view of a third embodiment of the present invention; and FIG. 5 is a side view of a fluid line system utilizing a hose according to the present invention.

FIG. 6 is a side view of a fluid line system which utilizes end coupling devices of the present invention.

DETAILED DESCRIPTION OF THE INVENTION

A first embodiment of the present invention is illustrated in FIG. 2. One end of a tubular hose 50 is shown and is formed into an integral connector housing 52. Connector housing 52 has an expanded diameter relative to the remainder of hose 50. A radial shoulder 54 is defined inside of housing 52. A seal package in the form of an O-ring seal 56 positioned between spacers 58 is press-fit into hose 50 against shoulder 54. Notches or slots 60 formed through the sidewall of hose 50 define radial locking walls 62.

Hose 50 may be formed from any material capable of being shaped at its ends into a functional and permanent connector body. Suitable materials include thermoplastics, elastomers, fluoropolymers, or combinations thereof which are capable of being formed into a housing. Nylon 6, 6/6, 11 or 12 (or combinations thereof) are preferred thermoplastics. Where appropriate, flexible metallic hose materials such as corrugated, fully annealed metallic/non-metallic braided hose composites or soft metal alloys could be utilized.

Processes capable of forming ends of a hose into geometrical shapes may be utilized to form integral connector housings 52. Examples include vacuum forming, cold forming, heat forming and in-line extrusion techniques. Notches 60 are formed by simple notching, cutting or piercing processes which may be integral or non-integral with the forming process.

The hose 50 formed with integral connector housings 52 will be of a minimum length of 100 mm. This minimum length accommodates the hose length required for forming each hose end into integral connector housings 52 and allows sufficient hose length remaining between the integral connector housings 52 to allow for adequate bend flexibility.

The hose 50 will be used in situations where the installer would need to bend the hose 50 for installation with the mating male portion 64. The need for manually bending the hose 50 is necessitated by the lack of precise tolerance of the location of the male portion 64 and the inability to have a consistent clearance area between the opposite male portions 64 due to variations of the packaging of other components. To allow the installer to install the hose, the degree of flexibility of the hose must be such that when the angular direction of the installation area differs from the angle of the hose form, the hose 50 can be flexed easily by hand to conform to the angle required to make the final installation of the flexible hose to the mating male member portion 64. To allow the installer to bend the flexible hose easily by hand, the force required to bend the flexible hose should be 5 newtons or less.

Tubular male member portion 64 of a fluid line system component is received in integral connector housing 52 of hose 50. Male member portion 64 includes a radially enlarged upset 66 which defines an abutment wall 68 formed substantially perpendicular to the outside surface of male member 64, and a sloped wall 70 facing open end 72. Sealing surface 74 extends between upset 66 and open end 72.

Male member portion 64 is inserted into hose 50 until upset 66 is aligned with notches 60 and abutment wall 68 has passed radial wall 62. Temporary expansion of hose 50 is necessary to move radially enlarged upset 66 into notch 60. Expansion is facilitated by sloped surface 70 of upset 66. Once upset 66 has moved beyond radial wall 62, abutment wall 68 bears against radial wall 62 to prevent retraction of male member 64 from hose 50. O-ring seal 56 contacts sealing surface 74 to establish a fluid seal between male member 64 and hose 50.

A second embodiment of the invention is shown in FIG. 3. Again, a flexible hose 80 is formed with an integral connector housing 82. Notches 84 define radial locking walls 86. Instead of including a seal package inside of hose 80, as in FIG. 2, an O-ring seal 88 is disposed between upset 92 and open end 94 of male member 90. A groove may be formed in the exterior surface of male member 90 to better secure O-ring 88 around male member 90.

A third embodiment of the invention is depicted in FIG. 4 and FIG. 5. Flexible hose 100 is formed with integral connector housing 102. An O-ring 104 is held between spacers 106 which are press-fit into hose 100 against radial shoulder 108. A latch 110 is attached to hose 100. Latch 110 includes locking beams 112 (one shown) which extend through slots formed in hose 100 into the interior of hose 100. Locking beams 112 define a radial locking wall 114.

Tubular male member portion 116 of a fluid line system component is received in integral connector housing 102 of hose 100. Male member portion 116 includes a radially enlarged upset 118 which defines an abutment wall 120 formed substantially perpendicular to the outside surface of male member 116. Sealing surface 122 extends between upset 118 and open end 124.

Male member portion 116 is inserted into hose 100 until upset 118 contacts locking beams 112 of latch 110. Continued insertion of male member 116 causes beams 112 to spread to permit passage of upset 118. Locking beams 112 may include sloped or canned surfaces to facilitate passage of upset 118. Once upset 118 has moved beyond beams 112, abutment wall 120 bears against radial wall 114 to prevent retraction of male member 116 from hose 100. O-ring seal 104 contacts sealing surface 122 to establish a fluid seal between male member 116 and hose 100.

FIG. 6 shows use of the present invention in a fluid line system. Hose 130 is formed with integral connector housings 132 at its ends. Latches 134, as described with reference to FIG. 4, are attached to hose 130. Seal packages (not shown) are disposed inside of hose 130. It is noted that though the embodiment of FIG. 4 is illustrated, the embodiments of FIGS. 2 and 3 could also be utilized.

Integral connector housings 132 receive male member portions of remote system components. A fuel line 136 and fuel filter 138 are illustrated. Visual comparison of the arrangement of FIG. 5 to the prior art arrangement of FIG. 1 is indicative of the reduced complexity of the present invention. External connector housings or fittings are eliminated. This reduces the number of potential leak paths and the length of the fluid line. Installation is accomplished in one step: insertion of a male member into a hose; rather than in two steps: expansion of a hose around a connector body stem and insertion of a male member into a connector body housing.

The present invention is usefull in applications where low to medium pressure fluid is involved, that is, where significant pull-apart forces are not encountered.

Various features of this invention have been explained with reference to the embodiments shown and described. Modification may be made to the described embodiments without departing from the spirit and scope of the invention as represented by the following claims.

What is claimed is:

1. A coupling comprising:
   a flexible hose defining a sidewall and at least one end portion, said hose defines a notch through said sidewall in said end portion of said hose, said notch defines a radial wall;
   a male member having a tubular portion received in said flexible hose, said tubular portion has a radially enlarged upset;
   a latch having two approximately parallel locking beams extending from a cross member, said latch extends through said notch to secure said male member to said flexible hose, wherein said latch abuts said radial wall and said radially enlarge upset to retain said male member in said end portion of said flexible hose.

2. A coupling as claimed in claim 1 wherein said flexible hose can be flexed easily by hand.

3. A coupling as claimed in claim 1 wherein said retainer is an upset formed to the outside surface of male member.

4. A coupling as claimed in claim 1 wherein said end portion of said hose is radially expanded and has a diameter greater than that of non-end portions of said hose.

5. A. coupling as claimed in claim 1 further comprises a seal to create a fluid seal between said male member and said hose.

6. A coupling as claimed in claim 5 wherein said seal is disposed inside of said housing.

7. A coupling as claimed in claim 5 wherein said seal is attached around said male member.

8. A coupling as claimed in claim 1 wherein said flexible hose has two end portions and said notch is formed in both end portions.

9. A coupling as claimed in claim 1 wherein said hose is made of thermoplastic.

10. A coupling as claimed in claim 1 wherein each of said locking beams abuts said radially enlarged upset.

11. A coupling as claimed in claim 1 wherein said cross member is positioned outside of said hose.

12. A coupling as claimed in claim 1 wherein said locking beams include sloped surfaces.

13. A coupling comprising:
   a flexible hose defining a sidewall and at least one end portion, said hose defines four notches through said sidewall in said end portion of said hose, said notches define a radial wall;
   a male member having a tubular portion received in said flexible hose, said tubular portion has a radially enlarged upset;

a latch extending through said notches to secure said male member to said flexible hose, wherein said latch abuts said radial wall and said radially enlarge upset to retain said male member in said end portion of said flexible hose.

14. A coupling as claimed in claim 13 wherein said latch has two locking beams extending from a cross member, one of said locking beams extends through two of said notches, other of said locking beams extends through other two of said notches.

15. A coupling as claimed in claim 14 wherein each of said locking beams abuts said radially enlarged upset.

16. A coupling comprising:

a flexible hose defining a sidewall and at least one end portion, said hose has a smooth outer surface and defines a notch through said sidewall in said end portion of said hose, said notch defines a radial wall;

a male member having a tubular portion received in said flexible hose, said tubular portion has a radially enlarged upset;

a latch extending through said notch to secure said male member to said flexible hose, wherein said latch abuts said radial wall and said radially enlarge upset to retain said male member in said end portion of said flexible hose.

* * * * *